United States Patent
Black et al.

(10) Patent No.: US 10,243,359 B2
(45) Date of Patent: Mar. 26, 2019

(54) METHOD AND SYSTEM FOR USING DEMAND SIDE RESOURCES TO PROVIDE FREQUENCY REGULATION USING A DYNAMIC ALLOCATION OF ENERGY RESOURCES

(71) Applicant: Battelle Memorial Institute, Columbus, OH (US)

(72) Inventors: Jason W. Black, Dublin, OH (US); Jason J. McCullough, Columbus, OH (US); Eric Rehberg, Westerville, OH (US); James E. Dvorsky, Plain City, OH (US); Seyed A. Mansouri, Columbus, OH (US)

(73) Assignee: BATTELLE MEMORIAL INSTITUTE, Columbus, OH (US)

( * ) Notice: Subject to any disclaimer, the term of this patent is extended or adjusted under 35 U.S.C. 154(b) by 411 days.

(21) Appl. No.: 14/436,019

(22) PCT Filed: Dec. 6, 2013

(86) PCT No.: PCT/US2013/073628
§ 371 (c)(1),
(2) Date: Apr. 15, 2015

(87) PCT Pub. No.: WO2014/089463
PCT Pub. Date: Jun. 12, 2014

(65) Prior Publication Data
US 2015/0295402 A1    Oct. 15, 2015

Related U.S. Application Data

(60) Provisional application No. 61/734,537, filed on Dec. 7, 2012.

(51) Int. Cl.
G05D 11/00 (2006.01)
H02J 1/00 (2006.01)
(Continued)

(52) U.S. Cl.
CPC ............... *H02J 1/00* (2013.01); *G05B 15/02* (2013.01); *H02J 3/14* (2013.01); *H02J 13/0006* (2013.01);
(Continued)

(58) Field of Classification Search
CPC ....... H02J 1/10; Y04S 20/222; Y02B 70/3225
(Continued)

(56) References Cited

U.S. PATENT DOCUMENTS

| | | | | |
|---|---|---|---|---|
| 2010/0292856 A1* | 11/2010 | Fujita | ..................... | G06Q 10/04 700/291 |
| 2011/0196546 A1* | 8/2011 | Muller | .................... | H02J 3/383 700/295 |

(Continued)

OTHER PUBLICATIONS

International Search Report and Written Opinion for PCT Serial No. PCT/US2013/073628.

*Primary Examiner* — Mohammad Ali
*Assistant Examiner* — Sheela S Rao
(74) *Attorney, Agent, or Firm* — Fay Sharpe LLP

(57) ABSTRACT

In a direct load control system supporting frequency control of an electrical grid, loads are grouped into a plurality of load aggregations based on electrical power draw characteristics of the loads, e.g. power draw magnitude characteristic and transient slew rate. A best-fit dispatch signal is generated for each load aggregation to match a desired load response with a sum of predicted load responses of the aggregations each operating in accord with its best-fit dispatch signal. For each load aggregation, its best-fit dispatch signal is communicated to the loads of the load aggregation, and the loads of the load aggregation are operated in accord with the best-fit dispatch signal communicated to the loads. The desired load response may be generated based on historical Automatic Generation Control (AGC) signal data (Continued)

and at least one of (1) a weather forecast and (2) daily, weekly, and seasonal cycles.

18 Claims, 7 Drawing Sheets

(51) Int. Cl.
*H02J 3/14* (2006.01)
*H02J 13/00* (2006.01)
*G05B 15/02* (2006.01)

(52) U.S. Cl.
CPC ......... *H02J 2003/143* (2013.01); *Y02A 30/12* (2018.01); *Y02B 70/3225* (2013.01); *Y02B 70/3266* (2013.01); *Y04S 20/222* (2013.01); *Y04S 20/224* (2013.01); *Y04S 20/242* (2013.01)

(58) Field of Classification Search
USPC ........................................ 700/286, 291, 295
See application file for complete search history.

(56) References Cited

U.S. PATENT DOCUMENTS

2011/0231320 A1* 9/2011 Irving .................... G06Q 30/00
 705/80
2012/0083930 A1 4/2012 Ilic et al.
2012/0239212 A1* 9/2012 Alexander ......... G01R 19/2513
 700/291

* cited by examiner

METHOD AND SYSTEM FOR USING DEMAND SIDE RESOURCES TO PROVIDE FREQUENCY REGULATION USING A DYNAMIC ALLOCATION OF ENERGY RESOURCES

This application claims the benefit of U.S. Provisional Application No. 61/734,537 filed Dec. 7, 2012 titled "Method and System for Using Demand Side Resources to Provide Frequency Regulation Using a Dynamic Allocation of Energy Resources". U.S. Provisional Application No. 61/734,537 filed Dec. 7, 2012 titled "Method and System for Using Demand Side Resources to Provide Frequency Regulation Using a Dynamic Allocation of Energy Resources" is incorporated herein by reference in its entirety.

BACKGROUND

The following relates to the electrical power grid arts, electrical power grid frequency control arts, and related arts.

Electrical power grid management includes maintenance of the target electrical frequency, e.g. at 60 Hz (in North America) or 50 Hz (in Europe). Electrical power generators are designed to operate at (by way of illustrative example) 60 Hz at a given load. If the load increases, this creates counter-torque on the generators which slows the mechanical rotation and consequently lowers the electrical frequency. Conversely, if the load decreases, the counter-torque is reduced, the mechanical rotation speed increases and consequently the electrical frequency increases.

In practice, the electrical frequency is measured in real-time to generate an Automatic Generation Control (AGC) signal. Based on the AGC signal, ancillary generators (typically gas-fired for rapid response) are throttled up or down to maintain the target electrical frequency. Rather than ancillary generators, energy storage devices such as batteries or flywheels can be used to absorb or inject power to maintain frequency. The ancillary generators (and/or batteries, flywheels, et cetera) are property of the power company and/or property of curtailment service providers (CSPs). In the former case, construction and maintenance of these frequency control devices is a direct cost to the utility company or other grid operator. In the latter case, the grid operator typically contracts with the CSP to obtain access to the ancillary generator for a prescribed time interval. In either case, scheduling of sufficient ancillary generator capacity is typically done ahead of time, while the actual frequency control is done using the ancillary generators based on the AGC signal, typically with a response time of minutes to tens of minutes for throttle-up or throttle-down of the ancillary generators.

The requirement to maintain sufficient ancillary generator capacity available for frequency control introduces substantial overhead cost and energy waste to the power grid. Overhead cost arises due to the need to construct and maintain the ancillary generators, and/or the cost of contracting with CSPs for access to these devices. These costs can be reduced by improved aggregate load prediction or modeling; however, the grid operator still must plan for unexpected load swings due to weather changes, social events, unexpected industrial loads, and so forth. Energy waste arises due to operational inefficiencies of the ancillary generators (or batteries, flywheels, et cetera).

One approach that has been contemplated to reduce the need for ancillary generators or the like is to construct loads to perform frequency response. Such "frequency response loads" are designed to detect the a.c. line frequency and to increase power usage (at least on average) when the frequency goes above the target frequency and to decrease power usage when the frequency goes below the target frequency. Frequency response loads can in principle improve frequency regulation, but the decentralized nature of this approach limits its usefulness. The grid operator does not control the frequency response loads, and so cannot rely upon these loads to maintain the target frequency. Accordingly, frequency control performed by the grid operator dominates, and the frequency response loads typically can, at most, provide secondary "fine tuning" of the electrical frequency. (Indeed, it is possible that a high density of frequency response loads may actually be detrimental, if the load modeling employed by the grid operator does not take these loads into account).

Another approach that has been contemplated to reduce the need for ancillary generators or the like is Direct Load Control (DLC). In this approach, the grid operator directly controls load operation. By utilizing loads that have an energy storage and/or time lag facet, DLC can in principle provide a mechanism for frequency control. For example, heating, ventilation, and air conditioning (HVAC) systems have high thermal capacity due to the thermal capacity of the heated air volume. Similarly, hot water tanks have thermal capacity in the form of the stored hot water. Using DLC, the grid operator can operate such loads in a manner that minimizes frequency fluctuations while still maintaining the desired room temperature, water temperature, or so forth.

BRIEF SUMMARY

In some illustrative embodiments disclosed as illustrative examples herein, a method comprises: grouping loads into a plurality of load aggregations based on electrical power draw characteristics of the loads; generating a best-fit dispatch signal for each load aggregation to match a desired load response with a sum of predicted load responses of the aggregations each operating in accord with its best-fit dispatch signal; and for each load aggregation, communicating its best-fit dispatch signal to the loads of the load aggregation. For each load aggregation, the loads of the load aggregation are operated in accord with the best-fit dispatch signal communicated to the loads. In some embodiments the desired load response is generated based on historical Automatic Generation Control (AGC) signal data and at least one of (1) a weather forecast and (2) daily, weekly, and seasonal cycles.

In some illustrative embodiments disclosed as illustrative examples herein, an aggregation dispatch controller comprises an electronic data processing device configured to: generate a best-fit dispatch signal for each load aggregation of a plurality of load aggregations to match a desired load response with a sum of predicted load responses of the aggregations each operating in accord with its best-fit dispatch signal, wherein the loads are grouped into the plurality of load aggregations based on electrical power draw characteristics of the loads including at least a power draw magnitude characteristic and a transient slew rate characteristic; and communicate the best-fit dispatch signal for each load aggregation to the loads of that load aggregation.

In some illustrative embodiments disclosed as illustrative examples herein, a non-transitory storage medium stores instructions executable by an electronic data processing device to perform power draw control operations for electrical loads that are grouped into the plurality of load aggregations based on electrical power draw characteristics of the loads including at least a power draw magnitude characteristic and a transient slew rate characteristic, the power control operations comprising: receiving load status reports from the loads at the electronic data processing device; generating a best-fit dispatch signal for each load aggregation of a plurality of load aggregations to (1) match a desired load response with a sum of predicted load responses of the aggregations each operating in accord with its best-fit dispatch signal, and (2) satisfy electrical draw requirements of the loads indicated by the load status reports; and transmitting the best-fit dispatch signal for each load aggregation from the electronic data processing device to the loads of that load aggregation. In some embodiments the generating is performed for a sliding prediction time window with a time lag $T_{lag}$ respective to the current time t wherein $t_{lag}$ is at least one minute and the operations of computing a load response error and updating the best-fit dispatch signal for one of the load aggregations to corrected the load response error is performed on a time frame of less than 30 seconds. The power control operations may further comprise: receiving updates to the desired load response; measuring a sum of actual load responses of the aggregations each operating in accord with its best-fit dispatch signal; computing a load response error as a difference between the updated desired load response and the measured sum of actual load responses; and updating the best-fit dispatch signal for one of the load aggregations to correct the load response error. The power control operations may further comprise generating the desired load response based on historical Automatic Generation Control (AGC) signal data and at least one of (1) a weather forecast and (2) daily, weekly, and seasonal cycles.

DETAILED DESCRIPTION

Disclosed herein are approaches for control of loads that leverages different characteristics of different load types to provide flexible direct load control (DLC) for frequency regulation. It is recognized herein that hot water heaters of various water capacities, flow rates and so forth, various types of heating, ventilation, and air conditioning (HVAC) systems, and other load types exhibit different power and energy consumption characteristics. These various load types can be leveraged to fulfill frequency regulation (FR) capacity by aggregating and dispatching multiple loads having different characteristic profiles in a manner that optimizes the combined response for providing frequency regulation.

Figure 1:
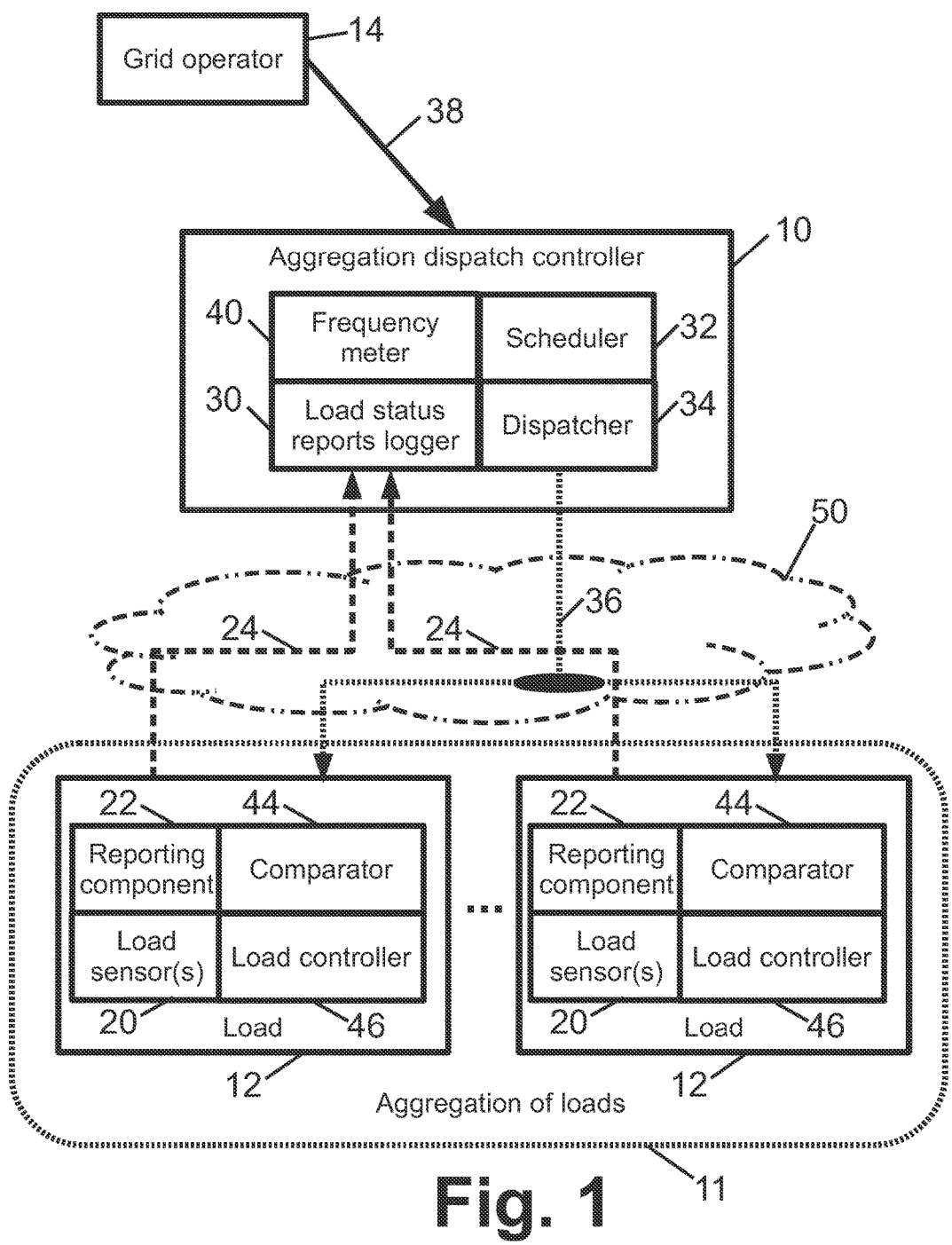
FIG. 1 diagrammatically shows a direct load control system comprising an aggregation of loads controlled by an aggregation dispatch controller.

By way of illustrative example, a frequency regulation system employing direct load control (DLC) is described with reference to FIGS. 1 and 2. With particular reference to FIG. 1, an aggregation dispatch controller 10 controls a population (i.e. aggregation 11) of electrical loads 12. The aggregation dispatch controller 10 interfaces with (or, in some embodiments, is a component of) the grid operator 14. The electrical loads (or devices) 12 are energy consuming devices with consumption flexibility. Some illustrative examples of flexible loads are thermal loads such as HVAC units or hot water heaters, and time-base loads such as dishwashers. Each load 12 performs state monitoring and provides periodic load status reports to the dispatch controller. As diagrammatically shown in FIG. 1, each load 12 includes one or more load sensors 20 for performing the state monitoring, and a reporting component 22 to perform the reporting function. The load sensors 20 may, for example, include a stored water temperature sensor and a water level sensor in the case of a hot water heater, a thermometer and so forth for a HVAC unit, a "ready" sensor for a dishwasher (indicating whether the dishwasher is loaded and hence "ready" to run), and so forth. The load sensor or sensors 20 for a given load 12 may optionally also include a user interface that enables (i.e. "senses") user inputs such as a temperature set point, flexibility parameters (e.g., a temperature range), constraints, overrides, or so forth. The reporting component 22 is a digital microprocessor or other electronic component that computes a load status report 24 in the form (n,KW) to be submitted by the load 12. The load status report 24 includes an urgency metric (n) indicating how critical it is for the load 12 to run in the next time interval, and a power draw level (kW) indicating how much power will be drawn by the load 12 during the next time interval if the load runs. Optionally, the load status report 24 may include constraints, e.g. an indication that the load must run (or cannot run) in the next time interval. Alternatively, such constraints can be built into the urgency metric, e.g. a value of "0" for the urgency metric (n) may indicate that the load cannot run in the next time interval, while a value of "100" for the urgency metric (n) may indicate that the load must run in the next time interval.

With continuing reference to FIG. 1, the aggregation dispatch controller 10 includes a load status reports logger 30 that logs the load status reports 24 received from the electrical loads 12 of the aggregation 11, and the optional load constraints. The dispatch controller 10 further includes a scheduler 32 and a dispatcher component 34 that compute and transmit, respectively, a single load dispatch signal ($S_{dispatch}$) 36 to all the electrical loads 12 of the aggregation 11. The dispatch signal ($S_{dispatch}$) 36 is the dispatch control point (or signal) and is computed by the scheduler 32 based on a baseline power expected to be drawn by the loads 12 of the aggregation 11 over the next time interval adjusted based on the Automatic Generation Control (AGC) signal 38 received from the grid operator 14 and/or other adjustments. The computation of the dispatch signal ($S_{dispatch}$) 36 takes into account the current operational electrical frequency as measured by a frequency meter 40 (as shown in FIG. 1) or as effectively represented by the AGC signal 38 or other indication of the need to add or shed load to maintain frequency stability. The dispatch controller 10 also optionally performs control and/or monitoring operations such as events monitoring to perform dispatch adjustments, and capacity monitoring and estimation. These optional operations enable the dispatch controller 10 to estimate the excess capacity available in the aggregation 11 of loads 12 for use in frequency control. This excess capacity may, in general, vary from time interval to time interval. For example, in the evening a large fraction of the dishwashers population may become unavailable for use in frequency control (i.e., are in a "must not run" state) as they are being loaded after the evening meal; whereas, a large fraction of the dishwashers population may become available for use in frequency control overnight as they are mostly loaded and ready to be run anytime overnight.

Figure 2:
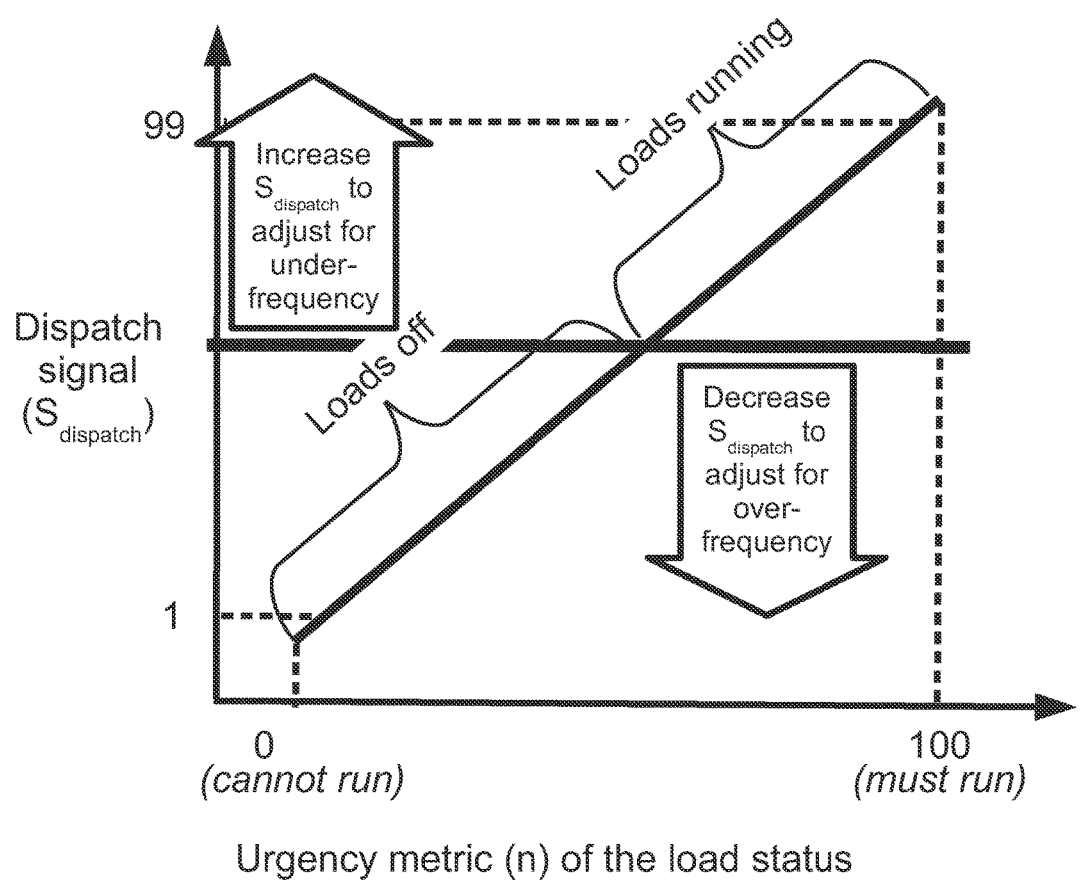
FIG. 2 diagrammatically plots the relationship between the dispatch signal ($S_{dispatch}$) generated by the aggregation dispatch controller and the urgency metric (n) of each load of the aggregation.

With continuing reference to FIG. 1 and with further reference to FIG. 2, the dispatcher component 34 of the aggregation dispatch controller 10 sends the dispatch signal ($S_{dispatch}$) 36 to each load 12 of the aggregation 11. Each electrical load 12 of the aggregation 11 further includes a comparator 44, which is an electronic component that compares the dispatch signal ($S_{dispatch}$) 26 with the urgency metric (n) of the load status. As diagrammatically shown in FIG. 2, if the urgency metric n is higher than the dispatch signal ($S_{dispatch}$) 36 then a load controller 46 of the load 12 runs the load 12 to draw power at the reported electrical draw level (kW) over the next time interval. On the other hand, if the urgency metric n is lower than the dispatch signal ($S_{dispatch}$) 36 then the load controller 46 of the load 12 does not run the load 12 and so no power is drawn. (The operational state over the next time interval for n=$S_{dispatch}$ can be either run or off, depending on the chosen configuration of the system).

A communication system 50 is provided to convey the load status reports 24 from the loads 12 to the dispatch controller 10, and to convey the dispatch signal ($S_{dispatch}$) 36 from the dispatch controller 10 to the loads 12. In FIG. 1, this communication system 50 is diagrammatically indicated by a dotted "cloud" indicating a wireless communication system, e.g. a cellular telephone network, WiFi, or the like. Additionally or alternatively, other communication systems can be employed, such as power line communication (PLC), e.g. broadband over power line (BPL), which may be a convenient communication pathway since the loads are all expected to be connected by electrical power lines. Various combinations are also contemplated, e.g. a WiFi feeding into a wired Ethernet into a cable network, et cetera.

The dispatch controller 10 is suitably embodied as a computer or other electronic data processing device. The functionality of the dispatch controller 10 may also be embodied as a non-transitory storage medium storing instructions executable by a computer or other electronic data processing device to perform the disclosed functions of the disclosed dispatch controller. The non-transitory storage medium may, for example, be a hard disk or other magnetic storage medium, an optical disk or other optical storage medium, random access memory (RAM), read-only memory (ROM), or other electronic storage medium, or so forth.

At the load end, the reporting component 22, the comparator 44, and the load controller 46 are suitably embodied as an electronic data processing device, for example a microcontroller or microprocessor and ancillary electronics (e.g., memory chip, power supply, et cetera) integrated with the load. In some embodiments, the electrical load 12 may initially include a programmable load controller that is retrofitted to modify its control based on the dispatch signal 36 as disclosed herein by modifying the load controller programming (e.g., via a firmware update) to perform the reporting and comparator functionality. The electrical loads 12 and the dispatch controller 10 also include suitable communication interfacing hardware (not explicitly indicated in FIG. 1) to send and receive the various signals, e.g. the load status reports 24 and the dispatch signal ($S_{dispatch}$) 36.

Some illustrative examples of the aggregative frequency control process performed by the system of FIG. 1 is now described.

Prior to the next time interval, each load 12 of the aggregation 11 performs a reporting operation that outputs the current load status report 24 for that load based on its current state prior to each time interval. This load status report 24 represents the current level of need for energy over the next time interval. The load status report 24 contains a state element (e.g., the urgency metric n) and a proposed power draw (i.e., the kW term of the status report). The state element or urgency metric (n) indicates how close the load is to its limit (either thermal or time) and the kW element indicates how much power (e.g., as measured in kilowatts) the load will consume during the next time interval if it runs. In the illustrative embodiment shown in FIG. 2, the state (i.e., urgency metric n) is on a scale from 0 to 100 inclusive, where 100 indicates fully discharged (that is, the load must run in the next time interval) and 0 indicates fully charged (that is, the load cannot run in the next time interval). Each electrical load 12 can also report its state as unavailable, which indicates that the load has been removed from the aggregation pool 11 for the time interval. (Alternatively, the "unavailable" state can be represented in this embodiment as an urgency metric value of "0" since this value ensures the load will not run in the next time interval. Additionally or alternatively, the unavailability can be indicated by setting the proposed power draw kW to zero).

The load status reports 24 are received by the reports logger 30 of the dispatch controller 10, and are optionally recorded in an archival record (not shown). The scheduler component 32 of the dispatch controller 10 then schedules the loads 12 for the next time interval, by selecting the appropriate dispatch signal ($S_{dispatch}$) 36. In one approach, all of the load reports 24 are ordered by their urgency metric (n) in an array (dispatch stack) so that the dispatch signal 36 can be chosen appropriately. In the illustrative example of FIG. 2, the dispatch signal ($S_{dispatch}$) 36 is in a range between 1 and 99 inclusive and will determine the number of loads 12 of the aggregation 11 that will be scheduled to be on or off as a baseline during the next time interval. A dispatch signal 36 of $S_{dispatch}$=99 will turn off the maximum number of loads, as all loads will be off except those loads with urgency n=100 (which must run). A dispatch signal 36 of $S_{dispatch}$=1 will turn on the maximum number of loads, as all loads will be on except those loads with urgency n=0 (which must be off). The urgency signal ($S_{dispatch}$) 36 is chosen to optimize the number of loads scheduled to be on or off during the next time period in order to achieve the desired available aggregate load shedding and/or addition for frequency control based on the received AGC signal 38. As diagrammatically indicated in FIG. 2, the dispatch signal ($S_{dispatch}$) 36 is then suitably adjusted upward to respond to an under-frequency condition and/or AGC down signal, as this upward adjustment decreases the number of loads running in the next time interval in order to shed load. Conversely, as further diagrammatically indicated in FIG. 2, the dispatch signal ($S_{dispatch}$) 36 is suitably adjusted downward to respond to an over-frequency condition and/or AGC up signal, as this downward adjustment increases the number of loads running in the next time interval in order to add load. The precise value of the dispatch signal ($S_{dispatch}$) 36 takes into account the current electrical frequency (or a suitable surrogate value such as an AGC signal) and the values of the load status reports 24 including both the urgency values (n) and the load power levels (kW). The total load for a given dispatch signal ($S_{dispatch}$) 36 can be estimated as the sum of the reported power values (kW) for all loads whose urgency metric (n) is greater than (or greater than or equal to) the dispatch signal ($S_{dispatch}$) 36. Once the dispatch signal ($S_{dispatch}$) 36 is chosen, it is sent to loads 12 of the aggregation 11 (that is, the same dispatch signal is sent to all selected loads of the aggregation). At each load 12, the comparator 46 determines whether its urgency value (n) is above or below the level of the dispatch signal 36 (that is, determines whether $n>S_{dispatch}$ or $n \geq S_{dispatch}$, depending on the choice of on or off for $n=S_{dispatch}$) and its load controller 46 turns the load on (at the reported kW level) or off according to this comparison. The duration of the "next time interval" is suitably chosen such that the states of the loads 12 will not change significantly during the period.

If the duration of the "next time interval" is longer than the desired time resolution of the frequency control, then the dispatch signal ($S_{dispatch}$) 36 may optionally be adjusted during the time interval to "fine-tune" the frequency control. For example, consider a "next time interval" that is of order minutes, and a desired frequency control resolution of order 2-4 seconds. In this variant, once the dispatch signal ($S_{dispatch}$) 36 is initially transmitted for the next time interval, the dispatch controller continues to receive updates of the AGC signal 38 every 2-4 seconds from the grid operator 14. (Or, alternatively, the readout of the frequency meter 40 continues to be sampled every 2-4 seconds). In response, the value of the dispatch signal ($S_{dispatch}$) 36 is adjusted from its current set point (that is, from the value sent at the beginning of the time interval), either higher or lower, in order to turn on or off the appropriate number of loads. In one approach, the increment (or decrement) of the dispatch signal 36 is $\Delta S_{dispatch}$. The amount of the adjustment is determined by summing up the KW of each load report 24 whose reported urgency metric value (n) is in the interval $\Delta S_{dispatch}$ immediately above (or below) the current value of the dispatch signal. Thus, the size of the increment $\Delta S_{dispatch}$ can be chosen to turn on (or off) the appropriate number of loads to achieve the requisite change in energy draw. In some embodiments, in order to meet an AGC ramp rate, the dispatch signal is adjusted proportionally over the time to meet the full ramp. For example, if there are 60 seconds to meet the full AGC request, the dispatch signal is adjusted by $\frac{1}{60}^{th}$ of the full change needed to meet the AGC request each second (or $\frac{1}{30}^{th}$ every 2 seconds if that is the control signal update interval, or so forth). The dispatch signal is updated at the appropriate frequency resolution interval (2-4 sec in this example) to maximize conformance with the AGC signal 38, e.g. to match the time period of the AGC update (which is 2-4 seconds in some electrical power grids in North America). As the AGC signal 38 changes, loads with a state that are closest to the original dispatch signal value will be turned on/off more often than those loads that are closer to the 0/100 state. In this case, these loads can be removed from the dispatch stack, either for the duration of the scheduling period, or for a shorter time that is appropriate to device constraints (e.g. a compressor can only be turned off/on every 10 minutes). This can also be accomplished by adjusting the original load status report urgency values up or down to indicate that the load has already received a dispatch signal that modified its original schedule for the period. That is, the load urgency state can be updated during the period if appropriate.

Post-dispatch load status adjustments are also contemplated. Some electrical loads may have limitations on the number of on/off events in a given time period, while others can be cycled on/off almost continuously. For loads with constraints, their status can be adjusted once they are dispatched to prevent subsequent selection and to allow for the minimum recovery/rest time period. This will allow for resource allocation over long time periods. Another application of this is that each load may submit subsequent load status reports that take the load out of the dispatch stack for future time periods, e.g. by setting n=0 (this could also occur within a time period, but would require intra-period load reporting updates).

The disclosed approach reconciles the potentially divergent goals of frequency control and efficient individual device operation. The individual loads 12 provide their status reports 24 which succinctly report their operational status in terms of amount of power (kW) and urgency (n). The loads 24 operate autonomously, but take into account the level of the dispatch signal 36 to delay operation where such delay is acceptable from the standpoint of the load. Loads that urgently need to draw power do so, and inform the dispatch controller 10 of this condition by setting n to a high value, while loads that can wait to operate inform the dispatch controller 10 of this condition by setting n to a low value. The dispatch controller 10 chooses the level of the dispatch signal 36 to ensure a sufficient number of loads operate (or do not operate) to achieve the frequency control goal, while permitting the loads to continue to operate as needed.

In the illustrative embodiment, each load status report 24 includes an urgency value that may be above or below the value of the dispatch signal 36. If the urgency value is above the dispatch signal value ($n>S_{dispatch}$ or $n \geq S_{dispatch}$) then the device runs, while if the urgency value is below the dispatch signal value ($n \leq S_{dispatch}$ or $n<S_{dispatch}$) then the device does not run. More generally, the loads 12 submit status reports 24 including urgency values and power levels, the dispatch controller 10 analyzes these reports along with electrical frequency information (either direct frequency measurement or a surrogate such as AGC signal) and generates the dispatch signal 36, and each load 12 runs at its reported power level in the next time interval if its urgency value satisfies the dispatch signal 36. (The illustrative example in which the dispatch signal 36 is in the range 1-99 is merely an example. By way of a further illustrative example, in another embodiment the urgency values are integer values of 1-20 with "1" indicating must run and "20" indicating must not run, and the load runs in this embodiment if the urgency value reported by the load is lower than the dispatch signal value).

In the foregoing illustrative examples, each load 12 submits a status report 24 with a single (n,kW) pair. In alternative embodiments, it is contemplated for a single load to be permitted to submit two or more status reports with different urgency and proposed power levels. In this case, if both urgency values satisfy the dispatch signal then the load is run at the power of the status report with the lower urgency value (that is, the less urgent load status report). For example (using the urgency scaling of FIG. 2), a single load may submit a more urgent report of (80, 5 kW) and a less urgent report of (20, 10 kW) for the same next time interval. In this example, if $S_{dispatch}$ is above 80 then the load does not run in the next time interval. If $S_{dispatch}$ is less than 80 but greater than 20 then the load runs at the power level of the more urgent report (80, 5 kW), that is, at 5 kW in the next time interval. Finally, if $S_{dispatch}$ is less than 20 then the device runs at the power level of the report with lower urgency value, that is, at the second reported power level of 10 kW. The optional permitting of multiple status reports from the same load enables the load to ensure (or at least make more likely) that it runs at some lower power level (5 kW in this case) while having the opportunity to run at a higher power level (10 kW in this case) if doing so is advantageous for frequency regulation (as indicated by a suitably low dispatch signal value from the dispatch controller). Note that in the foregoing example a load can ensure some minimal operating power level $P_{min}$ by submitting a load status report $(100, P_{min})$ indicating that the load must draw at least a minimum power level of $P_{min}$. Allowing multiple load status reports with different urgency levels from the same load also allows for taking maximum advantage of loads with variable, controllable power levels, such as variable speed motors or compressors, for example.

In general, the load 12 should run in the next time interval only if its urgency value satisfies the dispatch signal 36 output by the aggregation dispatch controller 10, and should not run in the next time interval if its urgency value does not satisfy the dispatch signal output. However, the loads 12 of the aggregation 11 are not directly controlled by the dispatch controller 10, and a load may run in variance with this condition under exceptional circumstances. For example, in the case of a dishwasher, the dishwasher may be programmed to begin running immediately if a human operator presses a "start" button on the dishwasher, regardless of the urgency status of the dishwasher and the dispatch signal value. (Another way of looking at this is as follows. When "start" is pressed, the load's urgency level immediately rises to 100, i.e. greater than whatever the dispatch signal level is, and hence immediately starts operating.) Similarly, a hot water tank may be programmed to begin heating immediately if the water flow out of the tank exceeds a threshold flow rate (thus indicating, for example, that someone is beginning to take a shower and draw hot water from the tank at a substantial rate). Safety interlocks may also define exceptional circumstances—for example, the hot water heater may be programmed to shut off immediately if the stored water temperature rises above a maximum threshold even if the dispatch signal and latest reported urgency value would indicate the hot water heater should continue to heat water.

Because the loads 12 remain under local control, and simply use the dispatch signal 36 from the dispatch controller 10 as an input value for the local load controller 44, 46, such operation at variance to the level of the dispatch signal 36 are readily accommodated. These exceptional circumstances under which the dispatch signal 36 is ignored are expected to occur infrequently, and respective to only a few loads of the aggregation 11 of loads over any given time interval, and so are not expected to significantly impact the overall power drawn by the aggregation 11. Thus, frequency control is not sacrificed by the occasional load 12 operating at variance to what would be expected given its reported status. In addition, the dispatch signal 36 can optionally be adjusted accordingly in response to such exceptional circumstances. This optional adjustment can be based simply on the variance in aggregate load or upon exception signals received directly from loads to indicate when they such events occur.

Figure 3:
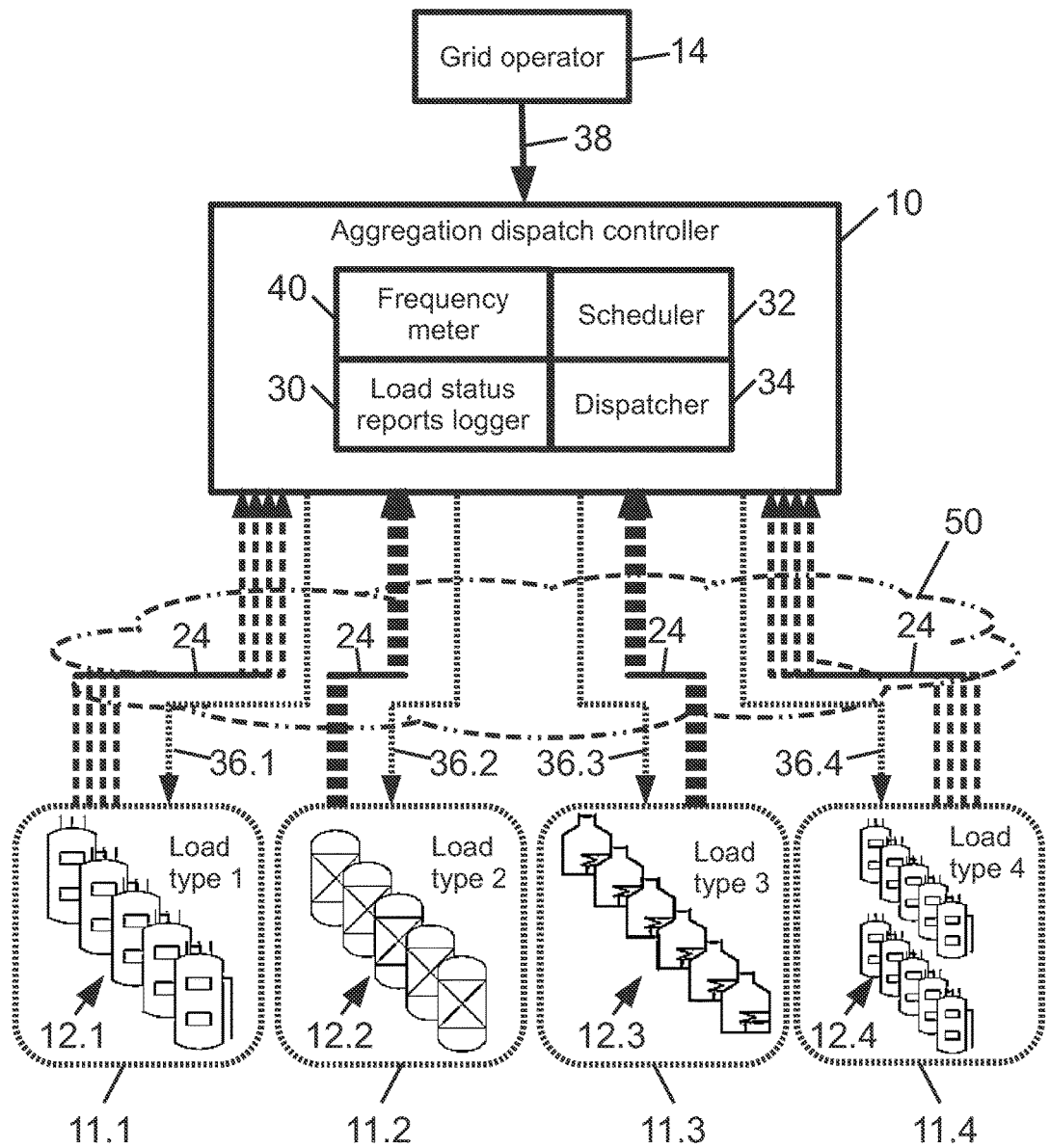
FIG. 3 diagrammatically shows a direct load control system similar to that of FIG. 1, but with four different aggregations of loads of four different load types respectively, controlled by an aggregation dispatch controller.

In the embodiment of FIG. 1, the load aggregation 11 comprises all loads 12 controlled by the dispatch controller. With reference to FIG. 3, in an alternative embodiment the total load population is divided into multiple groups (i.e. different aggregations 11) that are separately controlled. For example, due to the different operating characteristics of hot water tanks and of dishwashers, one aggregation may be hot water tanks, which are controlled by a dispatch signal $S_{dispatch,HWT}$ that is sent only to the hot water tanks, while another aggregation may be the dishwashers, which are controlled by a different dispatch signal $S_{dispatch,DW}$ that is sent only to the dishwashers. For example, in FIG. 3 the load population is divided into four aggregations 11.1, 11.2, 11.3, 11.4 respectively comprising aggregations of loads 12.1 of load type 1, loads 12.2 of load type 2, loads 12.3 of load type 3, and loads 12.4 of load type 4. This allows further tailoring of the dynamic and excess capacity characteristics of the overall load population for effective frequency control. The loads 12.1, 12.2, 12.3, 12.4 send load status reports 24 as described for the embodiment of FIG. 1. Additionally, each load is identified as to the load type 1, 2, 3, 4. This can be done in various ways, such as by including a load type value in the status report 24, or by having each load indexed by load type at the aggregation dispatch controller 10, or so forth. Each aggregation 11.1, 11.2, 11.3, 11.4 is controlled by a respective dispatch signal 36.1, 36.2, 36.3, 36.4 which is in general different for each aggregation.

Figure 4:
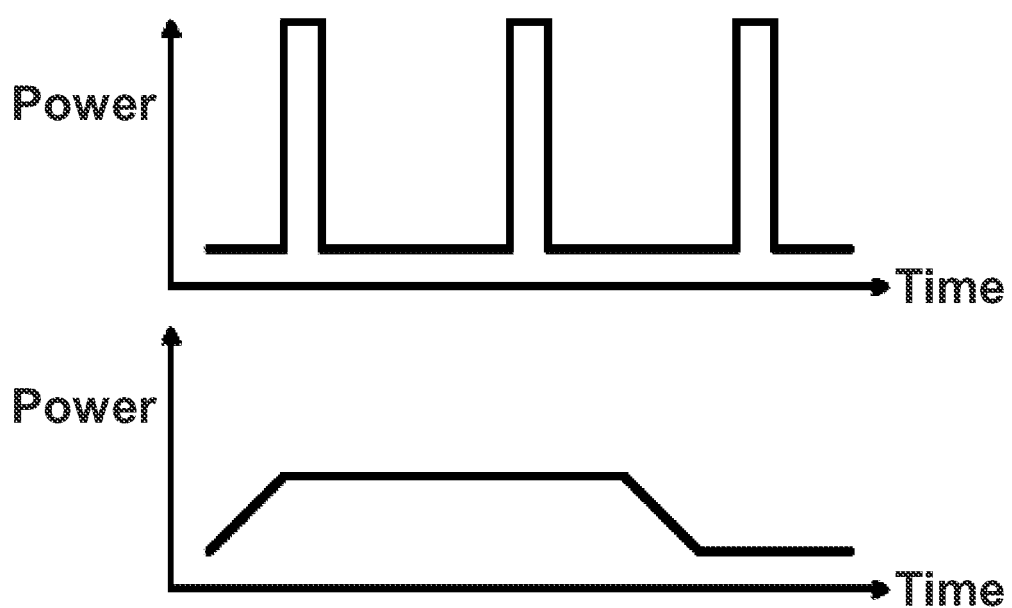
FIG. 4 diagrammatically shows response curves for two different illustrative load types with different power draw magnitudes and transient slew rates.

With reference to FIG. 4, power curves of two types of electrical loads are diagrammatically shown. The top power curve of FIG. 4 shows the power profile for a load type that draws relatively high power for short periods of time. In addition, the responsiveness of load (slew rate) is fast after a short (and known) time delay. As an example, this type of load may be a constant temperature salt bath for hardening machine tools. The bottom power curve of FIG. 4 depicts a power profile for a load that draws less power but over longer periods of time as compared with the load type depicted in the top power curve. This load type can respond immediately, but it takes time for full power draw to be achieved (that is, this load type has a low slew rate), as well as time to gradually shutdown. An example of a load type having the characteristic of the bottom power curve is an air conditioning unit.

The disclosed combination of different load types in the embodiment of FIG. 4 is analogous to how single-frequency Fourier components are combinable to create an arbitrary periodic signal. In analogous fashion, multiple load types having different power magnitudes, durations and responsiveness can be dispatched (combined) to create a load profile that matches the frequency regulation called for by the electric power grid (e.g., via the AGC signal 38).

Figure 5:
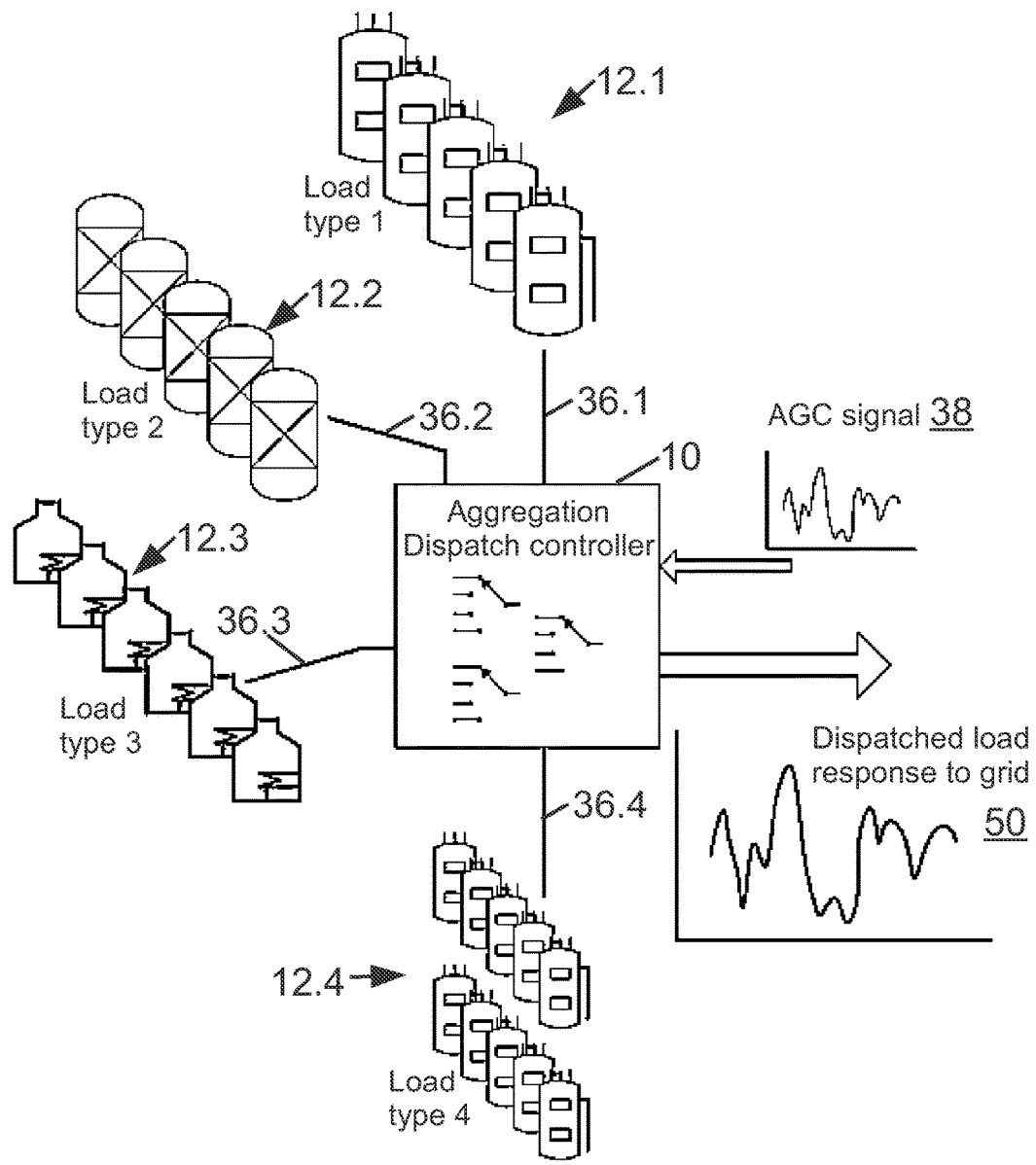
FIGS. 5-7 diagrammatically illustrate performance of the direct load control system of FIG. 3 to provide precisely tailored load response in support of frequency regulation of the electrical grid.

With reference to FIG. 5, an example of demand load control for frequency regulation performed by the system of FIG. 3 is diagrammatically shown. The different load types 1, 2, 3, and 4 with known characteristics communicate with and are aggregated by the aggregation dispatch controller 10 as respective aggregations 11.1, 11.2, 11.3, 11.4. The aggregation dispatch controller 10 receives the AGC signal 38 (or another suitable regulation signal) from the grid operator 14 or other entity administering the grid. The aggregation dispatch controller 10 controls power from the grid to the loads to achieve the desired performance of the loads (e.g. comfortable hot water temperature in a water heater) while also providing frequency regulation capacity (i.e. dispatched load response 50) for the grid, as described with reference to FIG. 1. However, in the embodiment of FIG. 3, the scheduler 32 advantageously matches the characteristics of the load characteristics of the various aggregations 11.1, 11.2, 11.3, 11.4 to the desired FR profile (e.g., as provided by the AGC signal 38) by generating a separate dispatch signal 36.1, 36.2, 36.3, 36.4 for each respective aggregation 11.1, 11.2, 11.3, 11.4. In this way, the controller 10 creates a more precise aggregate load response of the population of heterogeneous loads to effectively match transients and other characteristics of the AGC signal 38.

Figure 6:
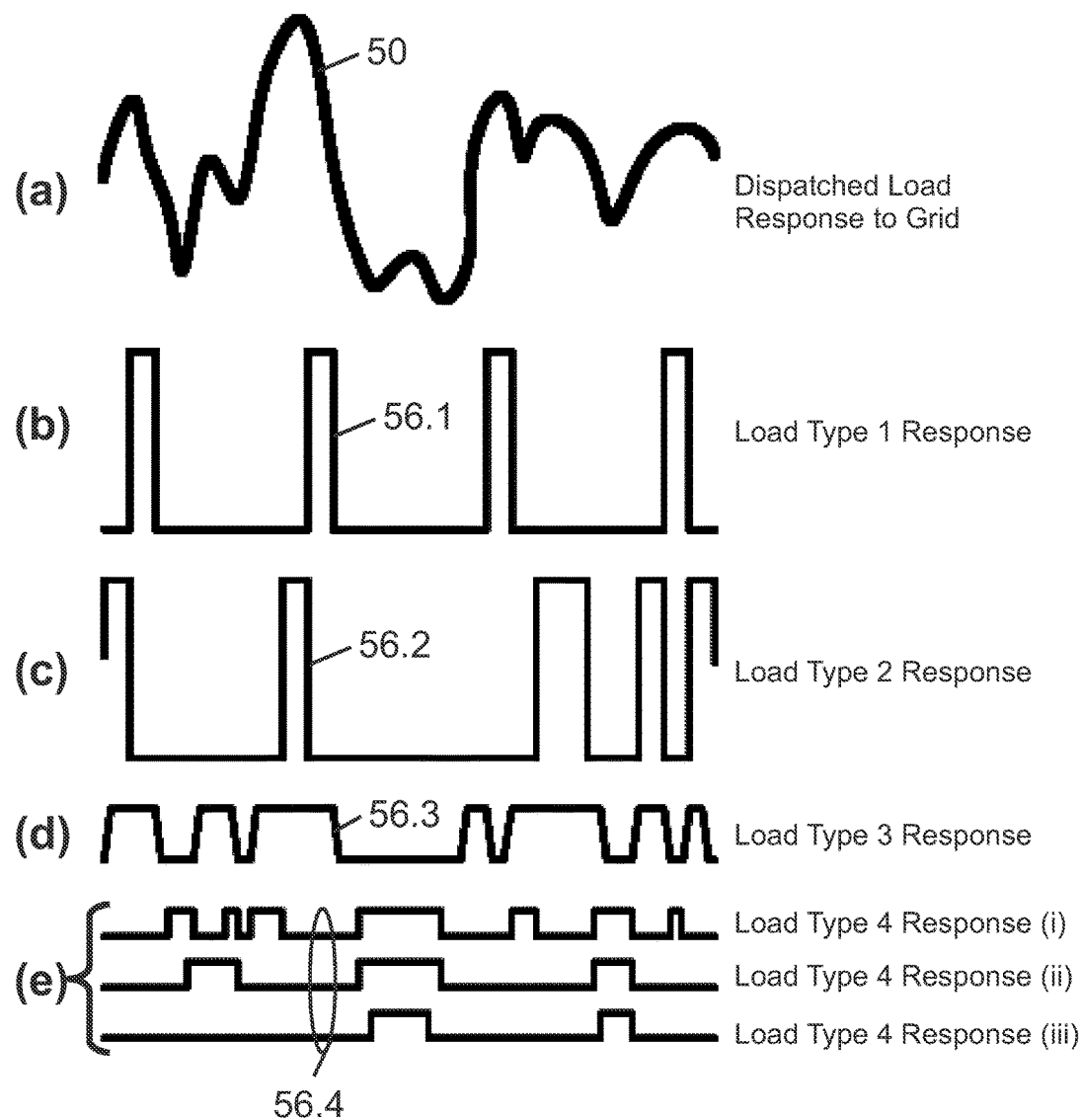

With continuing reference to FIG. 5 and further reference to FIG. 6, an illustrative example is shown of individualized dispatch to different load type aggregations so as to create a desired electrical response to achieve frequency regulation. Curve (a) is the load response 50 of the system of FIG. 5, and is responsive to grid conditions reflected in the AGC signal 38 to achieve frequency regulation. To generate the load response 50, the loads 12.1 of type 1 provide high power, fast and periodic power draw 56.1 (curve (b)) in response to dispatch signal 36.1 which is approximately synchronized with the peaks and troughs of the dispatched load response 50. It should be noted that the load response 50 is provided in near real-time respective to the AGC signal 38, and the AGC signal 38 is not typically a priori known to the aggregation dispatch controller 10. To do this, empirical analysis of historical data on AGC trends, optionally in conjunction with other information such as weather forecasts (which impact energy draw on a regional basis), knowledge of daily, weekly, and seasonal cycles, and so forth is used to approximately predict the AGC signal 38 in order to plan the dispatch signals 36.1, 36.2, 36.3, 36.4 for the respective aggregations 11.1, 11.2, 11.3, 11.4 to additively yield the desired load response 50.

While the load response 56.1 of the loads 12.1 of Type 1 fulfill a substantial portion of the magnitude of the load response 50 to the grid, these loads 12.1 may have characteristics (e.g. overall power draw magnitude, slew rate, and so forth) that limit the ability of loads 12.1 to accurately follow the AGC signal 38. To provide a more accurate load response, other load types are used to better match the combined load response 50 to the AGC signal 38. In the illustrative example of FIG. 6, loads 12.2 of type 2 provide a load response 56.2 (curve (c)) that when added to curve (b) provides a load response that more closely follows the AGC signal 38. The loads 12.2 have similar magnitude and response characteristics to the loads 12.1, but the response is not as periodic, as seen by comparing curve (c) with curve (b) in FIG. 6.

Loads 12.3 of type 3 have less power magnitude than load types 1 and 2 and exhibit slower on and off responses (that is, have lower slew rate), but as shown in FIG. 6, curve (d), this type of load can provide a sloped load response 56.3 that more precisely fits the rising and falling characteristics of the desired load response 50.

Curves (e) represent achievable load responses 56.4 of the loads 12.4 of type 4, which has relatively low magnitude but high versatility with respect to the timing of when this resource is engaged. In FIG. 6, three achievable load response curves (i), (ii) and (iii) are illustrated. A large number (e.g. thousands of units) of loads 56.4 of type 4 can be aggregated and controlled by the aggregation dispatch controller 10. This provides broad availability, flexibility and ability to bring precision to the desired load response through tailoring of the load response 56.4. Preferably, the loads 12.4 have low lag time between transients in the dispatch signal 36.4 and those transients appearing in the load response 56.4. Thus, the loads 56.4 of type 4 can be used to provide real-time corrections when the actual AGC signal 38 deviates from the AGC signal prediction generated based on empirical analysis of historical AGC data, weather forecasts, daily, weekly, and seasonal cycles, and so forth. It will be appreciated that further fine control of the load response 50 may be achieved by dividing the aggregation 11.4 of the loads 12.4 of type 4 into two or more sub-aggregations that have separate dispatch signals, e.g. a dispatch signal producing load response (i) may be sent to a first such sub-aggregation, a dispatch signal producing load response (ii) may be sent to a second such sub-aggregation, and so forth.

Figure 7:
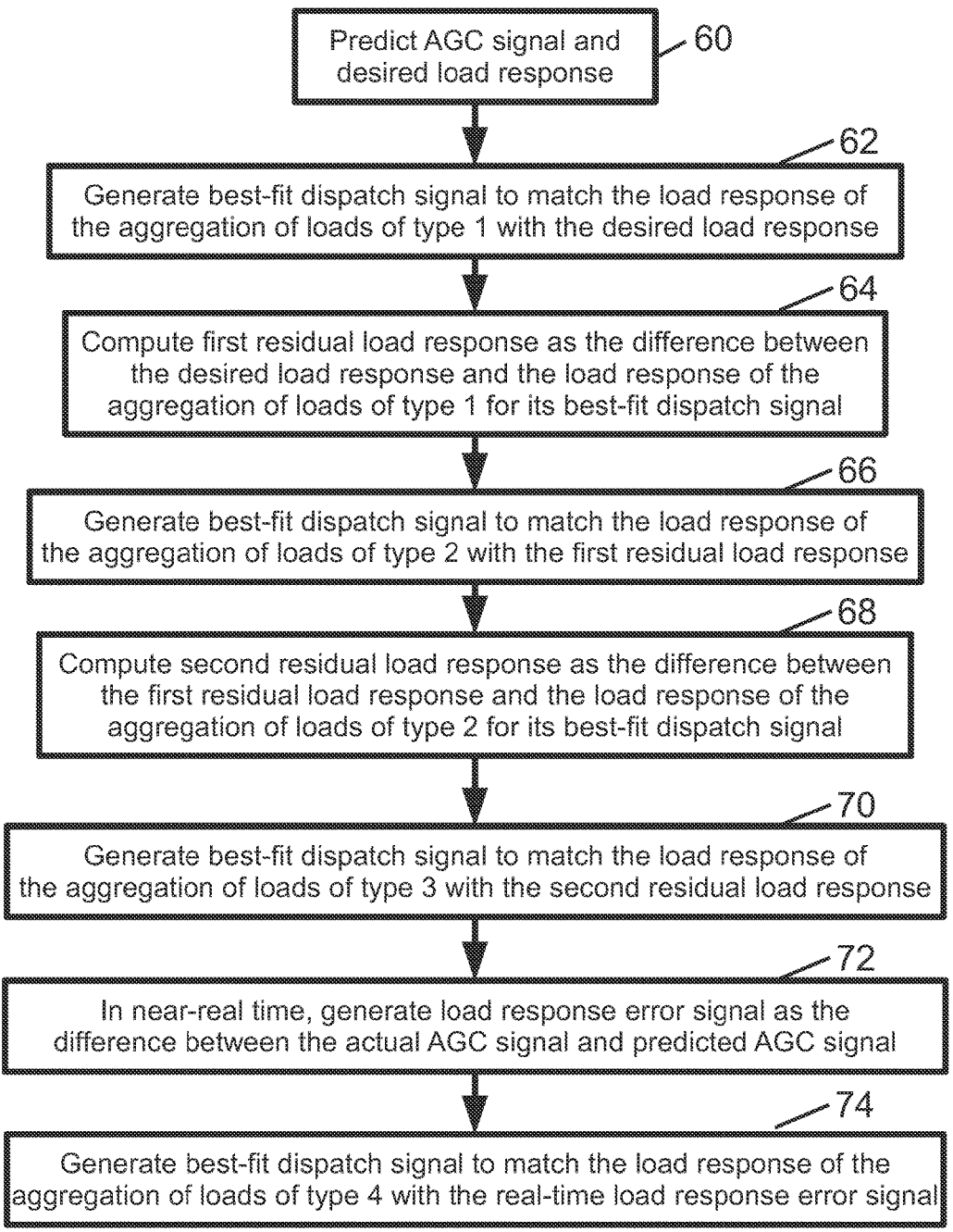

With continuing reference to FIGS. 5 and 6 and further reference to FIG. 7, an approach for designing the dispatch signals 36.1, 36.2, 36.3, 36.4 is described, which is suitably performed by the aggregation dispatch controller 10. In an operation 60, the AGC signal and its corresponding desired load response are predicted based on empirical analysis of historical AGC data, weather forecasts, daily, weekly, and seasonal cycles, and so forth. In an operation 62, the best-fit dispatch signal 36.1 for the aggregation 11.1 of loads 12.1 of type 1 is computed to provide the best fit of the load response 56.1 to the desired load response 50. In an operation 64, a first residual load response is computed as the difference between the desired load response 50 and the load response 56.1 of the aggregation 11.1 of loads 12.1 of type 1 for the best-fit dispatch signal 36.1 generated in operation 62.

In an operation 66, the best-fit dispatch signal 36.2 for the aggregation 11.2 of loads 12.2 of type 2 is computed to provide the best fit of the load response 56.2 to the first residual load response computed in operation 64. In an operation 68, a second residual load response is computed as the difference between the first residual load response computed in operation 64 and the load response 56.2 of the aggregation 11.2 of loads 12.2 of type 2 for the best-fit dispatch signal 36.2 generated in operation 66.

In an operation 70, the best-fit dispatch signal 36.3 for the aggregation 11.3 of loads 12.3 of type 3 is computed to provide the best fit of the load response 56.3 to the second residual load response computed in operation 68.

The additive combination of the load responses 56.1, 56.2, 56.3 is expected to provide a good approximate to the desired load response 50. The computational operations 60, 62, 64, 66, 68, 70 are performed for a sliding prediction time window with a time lag $T_{lag}$ respective to the current time t. Typically, the time lag $T_{lag}$ is of order several minutes to several tens of minutes (e.g. $T_{lag}$ greater than or equal to one minute in some embodiments), although longer or shorter lag times are also contemplated. Consequently, there is a relatively long time (on an electronic computational time scale) to perform the operations 60, 62, 64, 66, 68, 70. In general, the sequence of fitting operations is performed so that the load type with the least flexibility (e.g. relatively periodic with limited ability to be adjusted) is fitted first to produce the first residual load response, and loads with successively greater flexibility are applied in succession to fit the successive residuals to obtain a good fit to the predicted desired load response. Alternatively, if sufficient computational time is available (based on $T_{lag}$), some or all fitting operations may be combined in a more computationally intensive fitting process that simultaneously optimizes parameters of two or more (or all) of the load responses 56.1, 56.2, 56.3 to the desired load response 50. It is also to be appreciated that the number of load aggregations being fitted may be other than the illustrative three, e.g. the number of load aggregations being fitted may be two, three, four, five, or more, and moreover it is contemplated for two or more of the load aggregations to be of loads of the same type (e.g. as described for load type 4 in conjunction with FIG. 6).

With continuing reference to FIG. 7, in an operation 72 a load response error signal is generated in near-real time (e.g. with a lag respective to current time t on the order of a few seconds to a few tens of seconds, e.g. less than 30 seconds in some embodiments, although again lag times of greater or less than this range are contemplated). The load response error signal is the difference between the actual AGC signal and the AGC signal predicted in the operation 60 (or, equivalently, the difference between the load response requested by the actual AGC signal and the desired load response predicted in the operation 60). In an operation 74, the best-fit dispatch signal 36.4 for the aggregation 11.4 of loads 12.4 of type 4 is computed to provide correction for the load response error computed in the operation 72. Since this correction is being done in real-time (e.g. with lag on order seconds to tens of seconds) the loads used for the error correction preferably have a fast response time with small lag between transients in the dispatch signal 36.4 and response in the load response 56.4. On the other hand, the load response error is expected to be relatively small, assuming the prediction operation 60 is fairly accurate and the fitting operations 62, 64, 66, 68, 70 provide a relatively good fit for the combined load responses 56.1, 56.2, 56.3, and so the loads of type 4 can have power draw of relatively small magnitude. While only one "error correction" aggregation 11.4 is used in the illustrative load error correction, it is contemplated to use two or more aggregations as error correction aggregations to perform the error correction, for example using the residuals approach to match the load response error signal analogous to fitting operations 62, 64, 66, 68, 70. However, the use of multiple load aggregations as error correction aggregations may be limited by the intent to perform the correction in approximately real-time. On the other hand, if the prediction and fitting operations 60, 62, 64, 66, 68, 70 are sufficiently accurate, the real-time correction operations 72, 74 may be optionally omitted entirely.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A frequency regulation method providing frequency regulation of an electric grid using a population of electrical loads powered by the electric grid, comprising:
   grouping loads into a plurality of load aggregations based on electrical power draw characteristics of the loads;
   generating, for a sliding prediction time window with a time lag $T_{lag}$ respective to the current time t wherein $t_{lag}$ is at least one minute, a best-fit dispatch signal for each load aggregation to match a desired load response with a sum of predicted load responses of the aggregations each operating in accord with its best-fit dispatch signal;
   for each load aggregation, communicating its best-fit dispatch signal to the loads of the load aggregation;
   receiving updates to the desired load response;
   measuring a sum of actual load responses of the aggregations each operating in accord with its best-fit dispatch signal;
   computing, on a time frame of less than 30 seconds, a load response error as a difference between the updated desired load response and the measured sum of actual load responses;
   updating, on a time frame of less than 30 seconds, the best-fit dispatch signal for one of the load aggregations to correct the load response error;
   for each load aggregation, communicating an updated best-fit dispatch signal to correct the load response error; and
   operating each load aggregation in accordance with its updated best-fit dispatch signal.

2. The method of claim 1 further comprising:
   for each load aggregation, operating the loads of the load aggregation in accord with the best-fit dispatch signal communicated to the loads.

3. The method of claim 2 wherein the grouping and the generating are performed at an aggregation dispatch controller, the communicating comprises, for each load aggregation, communicating its best-fit dispatch signal from the aggregation dispatch controller to the loads of the load aggregation, and the operating comprises:
   for each load aggregation, operating each load of the load aggregation in accord with the best-fit dispatch signal communicated to the load.

4. The method of claim 3 further comprising:
   at each load of each load aggregation, computing a load status report including at least one pair (n,kW) where n is an urgency metric indicating how critical it is for the load to run and kW indicates a power draw level of the load if it runs;
   wherein the generating comprises generating the best-fit dispatch signal for each load aggregation to (i) match the desired load response and (ii) optimally satisfy the load status reports of the loads of the plurality of load aggregations.

5. The method of claim 1 wherein the generating comprises:
   (i) generating a best-fit dispatch signal for a first load aggregation of the plurality of load aggregations to match the desired load response with the load response of the first aggregation;
   (ii) computing a residual load response as a difference between the desired load response and the predicted load response of the first aggregation operating at its best-fit dispatch signal; and
   (iii) generating a best-fit dispatch signal for a second load aggregation of the plurality of load aggregations to match the residual load response with the load response of the second aggregation.

6. The method of claim 5 wherein the generating further comprises:
   repeating operations (ii) and (iii) at least once to generate a best-fit dispatch signal for at least a third load aggregation of the plurality of load aggregations.

7. The method of claim 6 further comprising:
   (iv) for each load aggregation, operating the loads of the load aggregation in accord with the best-fit dispatch signal communicated to the loads;
   (v) during the operating, generating a load response error signal as a difference between the desired load response and the sum of actual load responses of the aggregations generated by the operating;
   (vi) updating the dispatch signal for an error correction load aggregation of the plurality of load aggregations based on the load response error signal, wherein the communicating includes communicating the updated dispatch signal to the error correction aggregation and the operating includes operating the error correction aggregation in accord with the updated dispatch signal.

8. The method of claim 5 further comprising:
   generating the desired load response based on historical Automatic Generation Control (AGC) signal data and at least one of (1) a weather forecast and (2) daily, weekly, and seasonal cycles.

9. The method of claim 1 further comprising:

for each load aggregation, operating the loads of the load aggregation in accord with the best-fit dispatch signal communicated to the loads;

during the operating, generating a load response error signal as a difference between the desired load response and the sum of actual load responses of the aggregations generated by the operating; and updating the dispatch signal for a load aggregation of the plurality of load aggregations that is designated as an error correction aggregation based on the load response error signal;

wherein the communicating includes communicating the updated dispatch signal to the error correction aggregation and the operating includes operating the error correction aggregation in accord with the updated dispatch signal.

10. The method of claim 1 wherein the grouping comprises:

grouping the loads into the plurality of load aggregations based on electrical power draw characteristics of the loads including at least a power draw magnitude characteristic and a transient slew rate characteristic.

11. The method of claim 10 wherein the grouping the loads is further based on an electrical power draw characteristic comprising a lag time between transients in the dispatch signal and those transients appearing in the load response.

12. A frequency regulation system providing frequency regulation of an electric grid using a population of electrical loads powered by the electric grid, comprising:

an aggregation dispatch controller comprising an electronic data processing device and a memory, the memory storing instructions which when executed by the electronic data processing device, cause the electronic data processing device to:

generate, for a sliding prediction time window with a time lag $T_{lag}$ respective to the current time t wherein $t_{lag}$ is at least one minute, a best-fit dispatch signal for each load aggregation of a plurality of load aggregations to match a desired load response with a sum of predicted load responses of the aggregations each operating in accord with its best-fit dispatch signal, wherein the loads are grouped into the plurality of load aggregations based on electrical power draw characteristics of the loads including at least a power draw magnitude characteristic and a transient slew rate characteristic;

communicate the best-fit dispatch signal for each load aggregation to the loads of that load aggregation;

receive updates to the desired load response;

measure a sum of actual load responses of the aggregations each operating in accord with its best-fit dispatch signal;

compute, on a time frame of less than 30 seconds, a load response error as a difference between the updated desired load response and the measured sum of actual load responses;

update, on a time frame of less than 30 seconds, the best-fit dispatch signal for one of the load aggregations to correct the load response error; and communicate, for each load aggregation, an updated best-fit dispatch signal to correct the load response error, wherein, each load aggregation operates in accordance with its updated best-fit dispatch signal to regulate a frequency of the electrical grid.

13. The system of claim 12 further comprising:

said plurality of load aggregations grouped based on said electrical power draw characteristics, wherein the loads of each load aggregation are configured to operate in accord with the best-fit dispatch signal for that load aggregation.

14. The system of claim 13 wherein:

the loads of each load aggregation are further configured to generate and communicate to the aggregation dispatch controller a load status report indicative of power draw requirements of the load; and the aggregation dispatch controller is configured to generate the best-fit dispatch signals for the load aggregations to further satisfy the power draw requirements of the loads as indicated by the load status reports.

15. The system of claim 12 wherein the aggregation dispatch controller is configured to generate the best-fit dispatch signals for the load aggregations by operations including:

(i) generating a best-fit dispatch signal for a first load aggregation of the plurality of load aggregations to match the desired load response with the load response of the first aggregation;

(ii) computing a residual load response as a difference between the desired load response and the predicted load response of the first aggregation operating at its best-fit dispatch signal; and (iii) iteratively reducing the residual load response by generating best-fit dispatch signals for other load aggregations of the plurality of load aggregations to match the residual load response.

16. The system of claim 12 wherein the aggregation dispatch controller is further configured to generate a load response error as a difference between the desired load response and the sum of actual load responses of the aggregations operating in accord with the communicated best-fit dispatch signals and to update the dispatch signal for an error correction aggregation of the plurality of load aggregations to correct the load response error in real-time.

17. A non-transitory storage medium storing instructions executable by an electronic data processing device to provide frequency regulation of an electric grid using a population of electrical loads powered by the electric grid by performing power draw control operations for the electrical loads that are grouped into the plurality of load aggregations based on electrical power draw characteristics of the loads including at least a power draw magnitude characteristic and a transient slew rate characteristic, the power control operations comprising:

receiving load status reports from the loads at the electronic data processing device;

generating, for a sliding prediction time window with a time lag $T_{lag}$ respective to the current time t wherein $t_{lag}$ is at least one minute, a best-fit dispatch signal for each load aggregation of a plurality of load aggregations to (1) match a desired load response with a sum of predicted load responses of the aggregations each operating in accord with its best-fit dispatch signal, and (2) satisfy electrical draw requirements of the loads indicated by the load status reports;

transmitting the best-fit dispatch signal for each load aggregation from the electronic data processing device to the loads of that load aggregation;

receiving updates to the desired load response;

measuring a sum of actual load responses of the aggregations each operating in accord with its best-fit dispatch signal;

computing, on a time frame of less than 30 seconds, a load response error as a difference between the updated desired load response and the measured sum of actual load responses;

updating, on a time frame of less than 30 seconds, the best-fit dispatch signal for one of the load aggregations to correct the load response error;

for each load aggregation, transmitting an updated best-fit dispatch signal to correct the load response error; and operating each load aggregation in accordance with its updated best-fit dispatch signal.

18. The non-transitory storage medium of claim 17 wherein the power control operations further comprise:

generating the desired load response based on historical Automatic Generation Control (AGC) signal data and at least one of (1) a weather forecast and (2) daily, weekly, and seasonal cycles.

* * * * *